United States Patent [19]

Iu

[11] Patent Number: 5,471,252
[45] Date of Patent: Nov. 28, 1995

[54] METHOD AND APPARATUS FOR ESTIMATING MOTION VECTOR FIELDS BY REJECTING LOCAL OUTLIERS

[75] Inventor: Siu-Leong Iu, Bensalem, Pa.

[73] Assignee: Matsushita Electric Industrial Corporation of America, Secaucus, N.J.

[21] Appl. No.: 146,746

[22] Filed: Nov. 3, 1993

[51] Int. Cl.$^6$ .................................................. H04N 7/32
[52] U.S. Cl. ................................................. 348/699
[58] Field of Search ................................. 348/413, 416, 348/699; H04N 7/137

[56] References Cited

U.S. PATENT DOCUMENTS

| | | |
|---|---|---|
| 4,661,853 | 4/1987 | Roeder et al. . |
| 4,901,145 | 2/1990 | Harradine et al. ................. 348/699 |
| 5,198,901 | 3/1993 | Lynch ................................ 348/413 |
| 5,204,741 | 4/1993 | Sakaguchi . |
| 5,386,249 | 1/1995 | Strolle et al. . |

OTHER PUBLICATIONS

"A Systolic Realization of Symmetric Block Matching Algorithm for HD–MAC System"; by Sang–Yeon Kim et al.; 1993 IEEE; pp. 277–283.

"The Princeton Engine: A Real–Time Video System Simulator", by D. Chin et al; 1988 IEEE; pp. 285–287, 290–291, 294–297.

J. Konrad, "Bayesian Estimation of Motion Vector Fields", *IEEE Transactions on Pattern Analysis and Machine Intelligence*, vol. 14, No. 9, pp. 910–927 (Sep. 1992).

R. Depommier, et al., "Motion Estimation with Detection of Occlusion Areas", *IEEE International Conference on Acoustics and Speech Signal Processing*, pp. III–269–272 (1992).

B. Horn, et al, "Determining Optical Flow", *Artificial Intelligence*, vol. 17, pp. 185–203 (1981).

E. Hildreth, "Computations Underlying the Measurement of Visual Motion", *Artificial Intelligence*, vol. 23, pp. 309–354 (1984).

S. Geman, et al., "Stochastic Relaxation, Gibbs Distributions, and the Bayesian Restoration of Images", IEEE Transactions on Pattern Analysis and Machine Intelligence, vol. PAMI–6, No. 6, pp. 721–741 (Nov. 1984).

*Primary Examiner*—Tommy P. Chin
*Assistant Examiner*—Richard Lee
*Attorney, Agent, or Firm*—Ratner & Prestia

[57] ABSTRACT

An image analysis system generates a motion vector field from first and second images in a sequence of steps. First, random, initial motion vector values are assigned to each pixel in the image frame. Next, an objective function is defined for each motion vector and its corresponding motion vector in the other frame. The differences between the motion vectors of the target pixel value in the current frame and the other frame are minimized by minimizing the objective function values, first based on all neighboring pixel values. Next, the motion vector differences are further minimized by reducing the objective function values by rejecting motion vectors which correspond to the neighboring pixel values for which the value of the difference between the respective objective functions is outside of a threshold range. In one embodiment, pixel values in the first image frame are compared to neighboring pixel values in a second image frame which occurs after the first image and to other neighboring pixel values in a third image frame which occurs before the first image frame. This embodiment substantially eliminates motion vector errors due to both motion discontinuities and occlusion of pixels in the image.

18 Claims, 7 Drawing Sheets

METHOD AND APPARATUS FOR ESTIMATING MOTION VECTOR FIELDS BY REJECTING LOCAL OUTLIERS

FIELD OF THE INVENTION

The present invention relates to the analysis of sequences of images, made up of picture elements (pixels), which exhibit motion and, in particular, to apparatus and a method for estimating motion vector fields in a sequence of moving images.

BACKGROUND OF THE INVENTION

A motion vector field is a pixel-by-pixel map of image motion from one image frame to the next image frame. Each pixel in the frame has a motion vector which defines a matching pixel in the next frame or in a previous frame. The combination of these motion vectors is the motion vector field.

Although the techniques described herein could easily be applied to image components other than frames, such as image fields or portions of image frames, the description below refers only to image frames so as to avoid confusion in terminology with the fields of motion vectors.

The estimation of motion vector fields is an important task in many areas of endeavor such as computer vision, motion compensated coding of moving images, image noise reduction and image frame-rate conversion. The problem of estimating motion vector fields is inherently difficult to understand. This is because many different sets of motion vector fields can be used to describe a single image sequence.

One simple approach is to assume that a block of pixels moves with the same kind of motion such as constant translation or an affine motion. This kind of block matching approach frequently fails to produce a good estimation of motion because it disregards the motion of pixels outside of the block. Thus, the motion model may be incorrect for describing the true motion of pixels within a block when the block size is large and may be significantly affected by noise when the block size is small.

Conventional approaches to the problem of estimating motion vector fields typically require simultaneously solving equations having several thousand unknown quantities. Numerous techniques, based on gradients, correlation, spatiotemporal energy functions and feature matching have been proposed. These techniques have relied upon local image features such as the intensity of individual pixels and on more global features such as edges and object boundaries.

Recently, two processes have been proposed which have successfully solved two problems in motion vector estimation: motion vector discontinuity and occlusion. The first of these is these processes is the "line process" described in a paper by J. Konrad et al entitled "Bayesian Estimation of Motion=Vector Fields" *IEEE Transactions on Pattern Analysis and Machine Intelligence*, vol. 14, pp 910–927 September 1992. The second process is the "occlusion process" described in a paper by R. Depommier et al entitled "Motion Estimation with Detection of Occlusion Areas" *IEEE International Conference on Acoustics and Speech Signal Processing*, pp. III 269–272, 1992. Although successful, these processes increase substantially the number of unknowns that need to be estimated and also introduce other parameters particular to the line and/or occlusion processes.

Global formulations over the complete motion field have been proposed to deal with this deficiency of the block matching techniques. One such formulation is proposed by B. Horn et al. in a paper entitled "Determining Optical Flow" *Artificial Intelligence*, vol. 17, pp 185–203, 1981. According to this proposal, motion vectors are estimated by minimizing the error of the motion constraint equation and the error of motion smoothness over the entire image. In this formulation, the motion constraint equation is derived from the assumption that the image intensity is constant along the motion trajectory. Any departure from this assumed smooth motion is measured as the square of the magnitude of the gradient of motion vectors. While this approach improves the handling of general types of motion, such as elastic motion, it tends to blur the motion vector fields at places where the motion is not continuous (i.e. at motion boundaries).

In a paper by E. Hilderith, entitled "Computations Underlying the Measurement of Visual Motion," *Artificial Intelligence*, vol. 23 pp 309–354, 1984, a partial solution to the problem of handling motion boundaries is proposed. According to this proposal, the motion vector field is assumed to be smooth only along a contour but not across it. This proposal overcomes the blurring problem. Because, however, motion vectors at points not lying along contours cannot be obtained, this technique cannot propagate motion information across contours, such as those due to textures, which do not correspond to motion boundaries. These types of contours are common in real-world images.

As described above, a technique which combines the line process along with Markov random field modeling and stochastic relaxation has been proposed by S. Genman et al. in a paper entitled "Stochastic Relaxation, Gibbs Distributions, and the Bayesian Restoration of Images," *IEEE Transactions on Pattern Analysis and Machine Intelligence*, vol 6, pp 721–741, November 1984, the described technique was used for restoring degraded images. In this context, a line process is a boolean field to mark the image intensity boundaries. Other researchers have adapted this idea to overcome the blurring problem of an estimated motion vector field by modifying the line process to indicate motion boundaries. An example of this technique is contained the above referenced paper by J. Konrad et al. One drawback of this method is that one additional unknown must be introduced for every two adjoining pixels in order to implement the line process. These additional unknowns greatly increase the computational overhead of any algorithm which employs this method.

Occlusion, by definition, means that part of the image cannot find a matching part in another image which corresponds to the same part of the scene. That part of the image was occluded from one image frame to the next. Occlusion appears quite often in real-world images when, for example, one object moves in front of another object, an object moves toward the camera, or objects rotate. If only two frames are used, it is difficult to obtain a good estimate of motions with occlusion because, for at least some parts of one image, there is no corresponding image part in the other image.

One simple solution to this problem is to use three image frames, a target frame and the frames occurring immediately before and immediately after the target frame. In most cases of real-world images, a matching portion for image parts in the middle frame can be found in either the preceding or succeeding frame. The above referenced paper by Depommier et al. proposes a combination of the line process, as set forth in the Konrad et al. paper with an occlusion process to detect occlusion areas using three frames. One drawback of this combination, however, is that it requires even more unknowns and parameters to produce the model than the line process alone.

SUMMARY OF THE INVENTION

The present invention is embodied in an image analysis system which generates a motion vector field from first and second images by: defining an objective function of the motion vectors in the field, locally comparing motion vectors associated with a pixel value and its neighboring pixel values in the first image to corresponding motion vectors associated with pixel values in the second image according to the objective function; minimizing the objective function based on only some of the neighboring motion vectors. The rejected motion vectors corresponding to the neigh_boring motion vectors having a difference that is outside of a threshold range. The rejected neighboring motion vectors are rejected based only on locally available motion vector values.

DETAILED DESCRIPTION OF THE EXEMPLARY EMBODIMENTS

To understand the operation of the proposed invention, it is helpful to review the original technique for defining motion vector fields using smoothness assumptions in order to understand the nature of the problem.

When a camera moves relative to the objects being imaged, there are corresponding changes in the image. Disregarding, for the moment, the occlusion of areas and newly exposed areas, for every point of an image at time t, there exists a corresponding point in another image captured at a different time. We can connect every such pair of points by a respective straight line to yield a set of motion vectors and to define a displacement field (motion vector field) as the set of these vectors projected on the image plane. The purpose of motion vector field estimation is to estimate such a motion vector field from an observed image sequence. This motion vector field may then be used for various types of image processing that are useful in such fields as computer vision, the motion compensated coding of moving images, noise reduction and frame-rate conversion.

The following is a mathematical derivation of an exemplary method, according to the present invention, for generating data values representing a motion vector field other data values representing individual picture elements (pixels) of two or more images. The described method is not, however a mathematical method. This derivation is only presented to show the robustness of this method.

Let $\tilde{g}$ be the true underlying time-varying image observed via an ideal camera, and g be the observed image acquired from a normal camera which relates to $\tilde{g}$ through some transformations in the acquisition process such as filtering, gamma correction, quantization and distortion due to noise.

Figure 1:
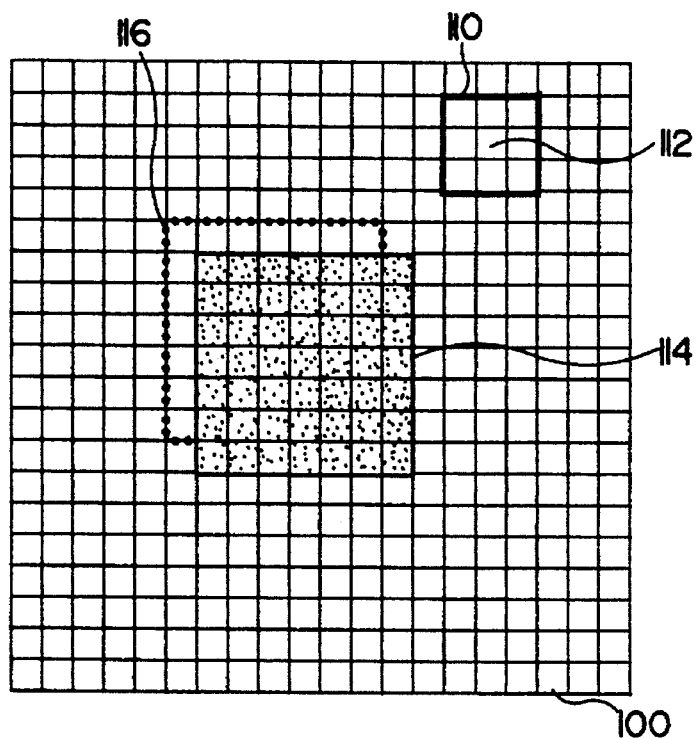
FIG. 1 (prior art) is a drawing of an exemplary input image according to the present invention.

The observed image g is sampled to produce a rectangular lattice $\Lambda$ of pixel values with vertical, horizontal and temporal sampling periods $(T_v, T_h, T_t)$. The total number of pixels in an image frame is denoted as $N=N_v \times N_h$. Pixels are ordered as $x_i=[mT_v, nT_h]$, where $i=mN_h+n$, $m=0, \ldots, N_v-1$ and $n=0, \ldots, N_h-1$. Let $g_k$ and $g(x,k)$ be the k-th image frame and the intensity at spatial position x of the k-th frame, respectively. Without loss of generality, we focus on the problem of estimating the motion vector field from frames $g_k$ and $g_{k+1}$. Let $\tilde{d}_t$ and $d_t$ be the true and estimate of such motion vector field, and $d_1(x_i)$ be the estimated motion vector at pixel $x_i$. let $\aleph_c(x_i)$ be the set of neighbors of pixel $x_i$ for a neighborhood system of size c (i.e. $\aleph_c(x_i)= \{(x_j; 0<\|x_i-x_j\|^2 \leq c\}$) and $|\aleph_c(x_i)|$ denotes the number of elements in $\aleph_c(x_i)$. Although it is contemplated that any neighborhood size may be used, for convenience in notation, the exemplary embodiments of the invention described below assume a system which includes a central pixel and its eight immediate neighbors (i.e $\aleph_2(x_i)$). An example of this neighborhood is shown in FIG. 1 with the reference number 110. In FIG. 1, each rectangular box represents a respective pixel position in the image. The central pixel in this neighborhood is identified by the reference number 112.

In order to obtain a motion vector field for the image shown in FIG. 1 and other images (not shown) in its motion sequence, it is desirable to specify a structural model relating motion vectors and image intensity values and to make some assumptions about the underlying true motion. It is common, for example, to assume that image intensity along motion trajectories does not change. This assumption is quantified in equation (1).

$$\tilde{g}_k(x)=\tilde{g}_{k+1}(x+\tilde{d}_t(x)) \qquad (1)$$

In addition, it is useful to assume that motion vectors vary smoothly in small neighborhoods. From these two assumptions, one can estimate motion in an image by minimizing the following energy function using the globally smooth (GS) motion model, $U_{GS}$, as defined in equation (2).

$$U_{GS_0}(d_t) = \qquad (2)$$

$$\sum_{i=0}^{N-1} \alpha(x_i, d_t(x_i), 1) + \lambda_0 \sum_{(x_i, x_j) \text{ are neighbors}} \beta(d_t(x_i), d_t(x_j))$$

where the displaced pixel difference square (PDS), $\alpha(x_i, d_t(x_i), 1)$, is defined by equation (3)

$$\alpha(x_i, d_t(x_i), 1) = [g_{k+1}(x_i + d(x_i)) - g_k(x_i)]^2 \qquad (3)$$

and the motion vector difference square (MDS), $\beta(d_l(x_i), d_l(x_j))$ by equation (4).

$$\beta(d_l(x_i), d_l(x_j)) = \|d_l(x_i) - d_l(x_j)\|^2 \quad (4)$$

The parameter $\lambda_0$ is a weighting factor which represents the importance of motion information relative to image intensity and the smoothness assumption.

To reconcile the smoothness assumption with the rejection of local outliers, we can rewrite equation (2) as equation (5).

$$U_{GS}(d_l) = \quad (5)$$

$$\sum_{i=0}^{N-1} \left\{ \alpha(x_i, d_l(x_i), I) + \lambda \frac{1}{|N(x_i)|} \sum_{x_j \in N(x_i)} \beta(d_l(x_i), d_l(x_j)) \right\}$$

Where $\lambda = |\aleph(x_i)| \lambda_0 / 2$.

It is apparent from the above that, at the motion boundary, the outliers are the MDS $\beta(d_l(x_i), d_l(x_j))$ when $x_j$ belongs to the other side of the motion boundary with respect to $x_i$. These outliers affect the estimate of $d_l(x_i)$ through the average of MDS $\beta(d_l(x_i), d_l(x_j))$ and propagate the error to other pixels through the overall energy function. If these outliers can be rejected before they enter into the average, they will not contribute to the blurring of the estimated motion vector field. A method of rejecting outliers based on a threshold has been found to produce good results. According to this method, the energy function of equation (5) is modified as shown in equation (6).

$$U_{LO}(d_l) = \quad (6)$$

$$\sum_{i=0}^{N-1} \left\{ \alpha(x_i, d_l(x_i), I) + \lambda \frac{1}{N_w(x_i)} \sum_{x_j \in \aleph(x_i)} \beta(d_l(x_i), d_l(x_j)) \delta_j \right\}$$

Where the indicating function $\delta_j$ is defined by equation (7) below.

$$\delta_j = \begin{cases} 1 & \text{if } \beta(d_l(x_i), d_l(x_j)) \leq T_{or} \bar{\beta} \\ 0 & \text{else} \end{cases} \quad (7)$$

and the total number of accepted neighbors is defined by equation (8).

$$N_W(x_i) = \sum_{x_j \in \aleph(x_i)} \delta_j \quad (8)$$

In equation (7), $\beta_r$ is the r-th rank of the ordered MDS of $\{\beta(d_l(x_i), d_l(x_j)), x_j \in \aleph(x_i)\}$, that is to say, $$\beta_0 \leq \beta_1 \leq \beta_2 \ldots \leq \beta_{|\aleph(x_i)|-1}; \quad (9)$$

and $T_{or} \geq 1$ is the threshold constant.

According to equation (6), outliers will be rejected from the average value of MDS if they have values greater than $T_{or}$ times the reference $\beta_r$. Since this threshold is derived from the MDS in $\aleph(x_i)$, the operation of rejecting outliers is not sensitive to the amplitude of motion vectors. Thus, a system which operates according to the equation (6) can distinguish outliers locally. In addition, in smooth areas of the image all neighbors are accepted since the MDS of all neighbors in these areas is similar by definition.

The selection of the threshold reference $\beta_r$ involves two conflicting factors: the largest number of outliers that may be rejected and the number of neighbors needed to propagate the assumption of smoothness. If the highest rank is selected then no outliers are rejected. If the lowest rank is selected, all neighbors except one are rejected as outliers and the smoothness assumption can propagate in only one direction. The inventor has determined that good performance is obtained for images which contain moving rectangular objects when $\beta_2$ is used as the reference, since it allows five outliers surrounding a moving corner to be rejected.

It is contemplated that other measures may be used to exclude outliers based on local measurements. For example, the threshold $T_{or}$ may be set to the median magnitude value of all of the motion vectors in the neighborhood. The use of this threshold value has an advantage since it decreases the number of computations needed to process each pixel in the image.

The method described above is applicable for generating a motion vector field for one image with reference to another adjacent field. As described above, however, this may not be sufficient to handle the occlusion problem since two other images, one before and one after the target image, are used to generate the motion vector field for the target image.

The method chooses between the best forward motion and the best backward motion as determined from the following frame $g_{k+l_1}$ and the preceding frame $g_{k+l_2}$, respectively, $l_1 > 0$ and $l_2 < 0$.

For the globally smooth motion model, the energy function, as described by equation (10) below, can be derived from equation (5), described above.

$$U_{GSFB_0}(d_{l_1}, d_{l_2}) = \sum_{i=0}^{N-1} \min_{l=l_1, l_2} \quad (10)$$

$$\left\{ w_l \left\{ \alpha(x_i, d_l(x_i), I) + \lambda_l \frac{1}{|\aleph(x_i)|} \sum_{x_j \in \aleph(x_i)} \beta(d_l(x_i), d_l(x_j)) \right\} \right\}$$

where the factors $w_l$ are weights which determine the relative importance of motion information from the different frames.

To reduce computation, it is assumed that motion vector fields at each pixel follow constant translation. This is represented by equation (11).

$$d_{l_2}(x_i) = (l_2/l_1) d_{l_1}(x_i) \quad (11)$$

The energy function using the globally smooth motion model with forward and backward motion may be defined using equation (12), $$U_{GSFB}(d_{l_1}) = \sum_{i=0}^{N-1} \min_{l=l_1, l_2} \left\{ w_l \left\{ \alpha(x_i, d_l(x_i), I) + \lambda_l \frac{1}{|\aleph(x_i)|} \sum_{x_j \in \aleph(x_i)} \beta(d_l(x_i), d_l(x_j)) \right\} \right\} \quad (12)$$

Similarly, the energy function which uses local outliers for forward and backward motion may be defined using equation (13).

$$U_{LOFB}(d_{l_1}) = \sum_{i=0}^{N-1} \min_{l=l_1, l_2} \left\{ w_l \left\{ \alpha(x_i, d_l(x_i), l) + \lambda_l \frac{1}{N_w(x_i)} \sum_{x_j \in \aleph(x_i)} \beta(d_l(x_i), d_l(x_j)) \delta_j \right\} \right\} \quad (13)$$

The estimate of motion vector fields can be determined by minimizing either equation (12) or equation (13) using three given frames as constrained by equation (11). In this operation, when $l_2 = -l_1$, it is helpful to assume the following:

$$w_{l_1} = w_{l_2} \text{ and} \quad (15)$$

$$\lambda_{l_1} = \lambda_{l_2} \quad (16)$$

Many methods may be used to minimize the energy functions in equations (5), (6), (12) and (13). The inventor has selected a technique known as simulated annealing as described in the above-referenced paper by Genman et al.

The following is a summary description of this algorithm. Assume $S_d$ represents the set of possible motion vector values having accuracy $\Delta$ and total levels $2N_d+1$ in each direction. This is stated in equation (17).

$$S_d = \left\{ d_{ij} : d_{ij} = \begin{bmatrix} i\Delta \\ j\Delta \end{bmatrix}, i, j = 0, \pm 1, \ldots, \pm N_d \right\} \quad (17)$$

Assume $I = \{0, \ldots, N-1\}$ and $I_i = I - \{i\}$. It is desired to estimate an unknown motion vector field $d_l$ with energy function $U(d_l)$. The motion vector field $d_l$ may be modeled as a random field with the Gibbs distribution, as shown in equation (18).

$$P(d_l) = \frac{1}{Z} e^{-U(d_l)/T} \quad (18)$$

In this equation the variable T is a simulated temperature for annealing and Z is a normalizing parameter such that $\Sigma P(d_l) = 1$. Using Bayes rule and the law of total probability, the probability of a motion vector at a current pixel $x_i$, given motion vectors of pixels other than pixel $x_i$ may be expressed as shown in equations (19) and (20).

$$P(\hat{d}_l(x_i) = d_l(x_i) | d_l(x_q) = \bar{d}_l(x_q), q \in I_i) = \quad (19)$$

$$= \frac{P(d_l(x_q) = \bar{d}_l(x_q), q \in I)}{\sum_{z \in S_d} P(d_l(x_i) = z, d_l(x_q) = \bar{d}_l(x_q), q \in I_i)}$$

$$= \frac{e^{-U(d_l(x_q) = \bar{d}_l(x_q), q \in I)/T}}{\sum_{z \in S_d} e^{-U(d_l(x_i) = z, d_l(x_q) = \bar{d}_l(x_q), q \in I_i)/T}} \quad (20)$$

If $T_0$ is assumed to be the initial simulated temperature, $T_f$ is assumed to be the final simulated temperature, and $d_{l0}$ is an arbitrary initial estimate of the motion vector field, then the algorithm of simulated annealing can be used to minimize the energy functions of equations (5), (6), (13) and (14) using the following algorithm.

Set temperature to $T_0$
While temperature is greater than $T_f$
For $i = 0, \ldots N-1$
  Replace $d_l(x_i)$ in the chosen energy function by the random sample generated from the conditional probability in equation (20)
  Decrease temperature following some annealing schedule The inventor has determined that the annealing schedule should start from a very high simulated temperature (e.g. $T_0 = 500$) and end at a low temperature (e.g. $T_f = 0.1$). In addition, the inventor has determined that an annealing schedule which produces good results defines the simulated temperature $T_k$ for the k-th iteration by the exponential function of equation (21).

$$T_k = T_0 a^{k-1} \quad (21)$$

where "a" is a constant slightly less than 1.0. A two-dimensional random sample is generated from the bivariate discrete probability distribution in equation (20) by first generating the vertical component from the one-dimensional marginal cumulative distribution obtained by accumulating the two-dimensional distribution horizontally. The horizontal component can then be generated from the one-dimensional cumulative distribution obtained from the two-dimensional distribution given by the generated vertical component.

For the energy functions in equations (5), (6), (12) and (13), the corresponding conditional probability of equation (20) can be reduced to relate to only some local energy functions. For example, for the energy function of the globally smooth motion models, the local energy function of the current pixel, $x_i$, as given by equation (22)

$$U^i_{GS}(d_l(x_i) = z, d_l(x_q) = \quad (22)$$

$$\bar{d}_l(x_q), x_q \in \aleph(x_i)) =$$

$$\alpha(x_{i,z,l}) + \lambda \sum_{\substack{x_q \in \aleph(x_i) \\ d_l(x_i) = z}} \left\{ \frac{1}{|\aleph(x_i)|} \sum_{x_j \in \aleph^+(x_i)} \beta(d_l(x_q), d_l(x_j)) \right\}$$

where $$\aleph^+(x_i) = \aleph(x_i) \cup \{x_i\} \text{ and } \aleph(x_i) = \bigcup_{x_q \in \aleph(x_i)} \{x_j : x_j \in \aleph(x_q)\} - \{x_i\}$$

The first term in equation (19) can be precomputed before the simulated annealing starts. The second term only depends on the motion vector of the surrounding pixels in $\aleph(x_i)$. Accordingly, the new motion vectors for all pixels in the image may be calculated simultaneously. Thus, the minimization problem may be solved on a pixel-by-pixel basis using a highly parallel processor such as the processor shown in FIG. 6, described below. An exemplary processor suitable for use in generating motion vector fields according to the subject invention is the Princeton Engine, as described in a paper by D. Chin et al. entitled "The Princeton Engine: A Real-Time Video System Simulator" *IEEE Transactions on Consumer Electronics*, May, 1988, pp 285–297.

It is noted that, while equation (22) concerns the globally smooth motion model, it may be readily modified in the same manner as between equations (5) and (6) and equations (12) and (13) to produce an equivalent energy function which uses local outlier rejection. In addition, for the globally smooth motion model, equation (22) may be further reduced to produce the energy function defined by equation (23).

$$U^i_{GS}(d_l(x_i) = z, d_l(x_i)) = \quad (23)$$

-continued $$d_l(x_i), x_q \aleph(x_i)) = \alpha(x_i,z,l) + \frac{2\lambda}{|\aleph(x_i)|} \sum_{x_j \aleph(x_i)} \beta(z,d_l(x_j))$$

Reference is now made to FIGS. 1–5 to describe the operation of the process. In FIG. 1, a square central portion 114 is defined in an image 100 frame. In this image, each small rectangle corresponds to a respectively different pixel value. The exemplary image data used by the apparatus and methods described has pixels with random values. The image is shown having contrasting central and surrounding parts for clarity in the description.

Figure 2:
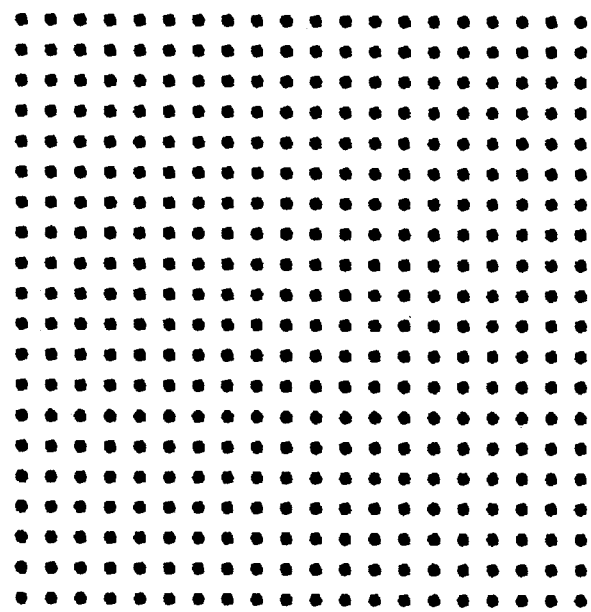
FIG. 2 (prior art) is a drawing of an image vector field for a motionless sequence of images according to FIG. 1.

If there is no motion from this frame to the next frame, a motion vector field such as that shown in FIG. 2 is generated. In this motion vector field, all vector elements are zero, indicating no motion in the image.

If, however, the central area 114 moves to the position 116, as indicated by the broken-line box, between the current frame and the next frame then the motion vector for each pixel in the area should indicate that the pixel has moved in the direction of the motion.

Figure 3:
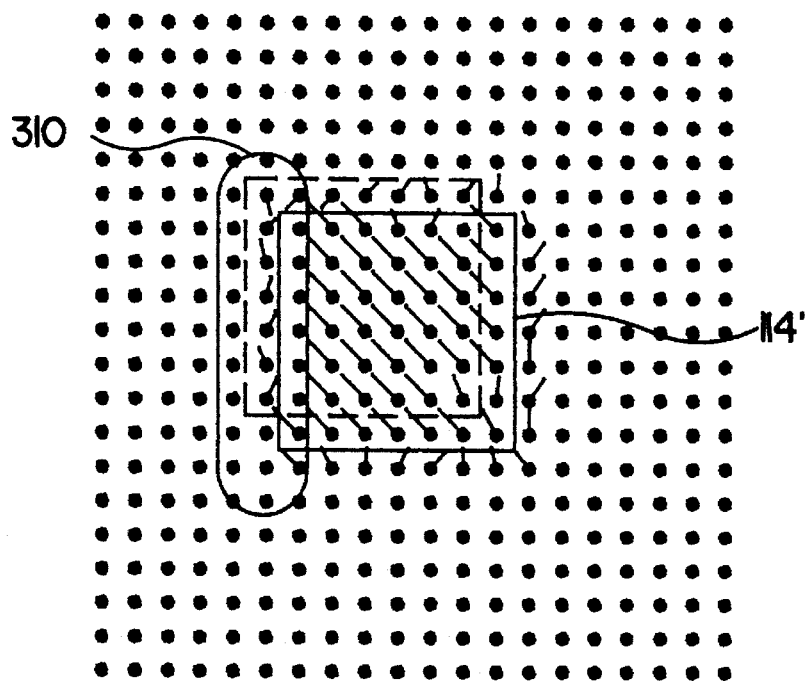
FIG. 3 (prior art) is a drawing of an image vector field for a sequence of images according to FIG. 1 which include a moving component.

Using prior art techniques, however, which assume globally smooth motion, a motion vector field such as that shown in FIG. 3 is generated. In this field, a central area 114' corresponds to the area 114 in the frame image shown in FIG. 1. It is noted that the motion vectors in the center of the area 114' are correct but that the vectors at the motion boundaries, such as that shown in the area 310, are incorrect. The motion vectors above and to the left of the area 114' are erroneous due to occlusion. The motion vectors below and to the right of the area 114' are erroneous due to motion discontinuities.

If this data were applied to video encoding apparatus, erroneous motion vectors may be generated, increasing the amount of data needed to represent the encoded image frame.

Figure 4:
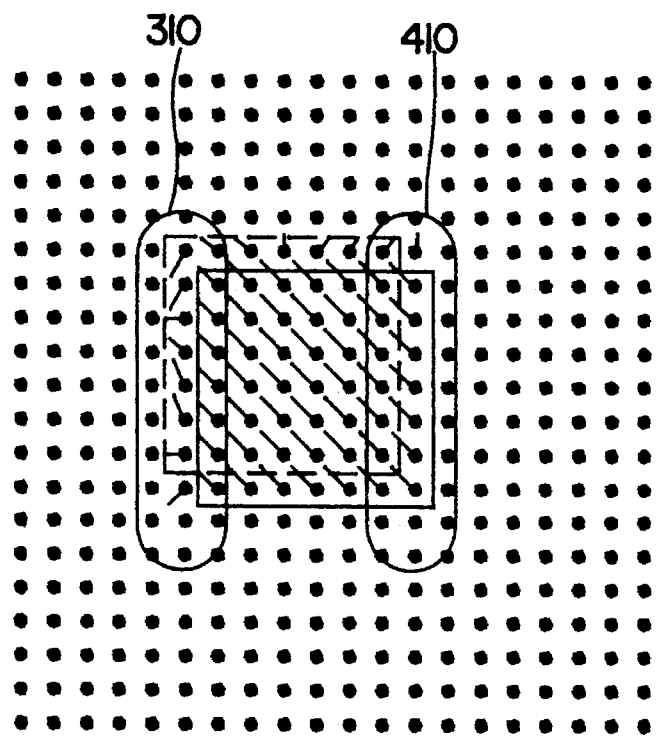
FIG. 4 is a drawing of an estimated image vector field produced using a first embodiment of the invention for images according to FIG. 1.

When a method according to the present invention is used to generate the motion vector field from two frames, one containing the area 114 and the other containing the area 116, a motion vector field such as that shown in FIG. 4 is generated. It is noted that errors related to the motion discontinuities, such as the errors in the area 410, have been eliminated but errors related to occlusion, such as in the area 310, remain.

Figure 5:
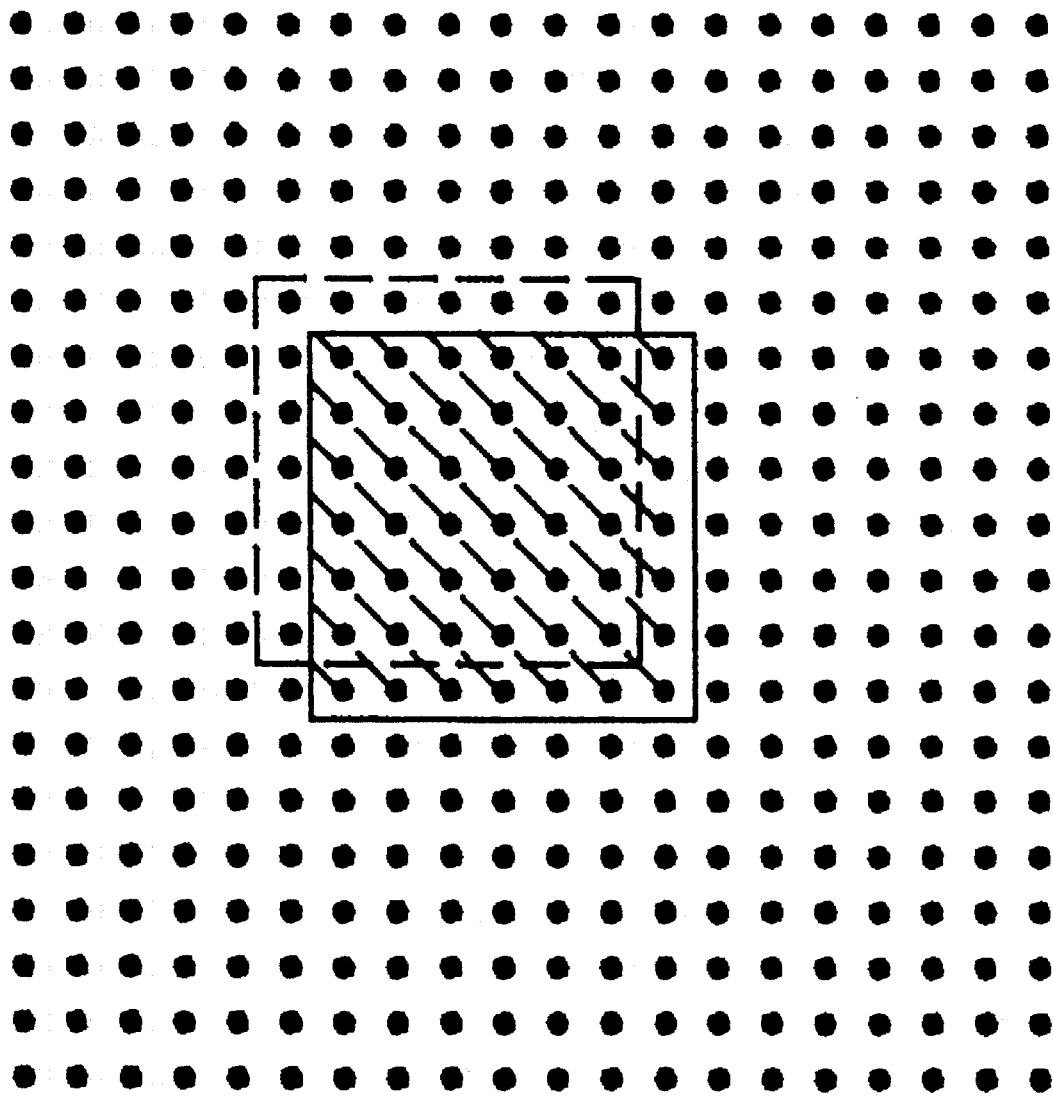
FIG. 5 is a drawing of an estimated image vector field produced using a second embodiment of the invention for first, second and third images according to FIG. 1.

As described above, errors related to occlusion may be eliminated by using a method according to the present invention in which two other frames, one before and one after the current frame are used with the current frame, to generate the data values representing the motion vector field. An exemplary motion vector field generated by this method is shown in FIG. 5. It is noted that there are no significant errors in any of the motion vectors which make up the motion vector field.

As described above, FIG. 6 is a block diagram of a highly parallel processor system which may be used to generate motion vector fields in accordance with the present invention. This processor system includes Nh times Nv processors $P_{0,0}$ through $P_{Nv-1,Nh-1}$. Thus, the processor system has one processor for each pixel in the current image. It is contemplated that other parallel architectures may be used having fewer than one processor per pixel or that the process described below may be implemented on a single processor by serially processing each pixel in the current frame.

Figure 6:
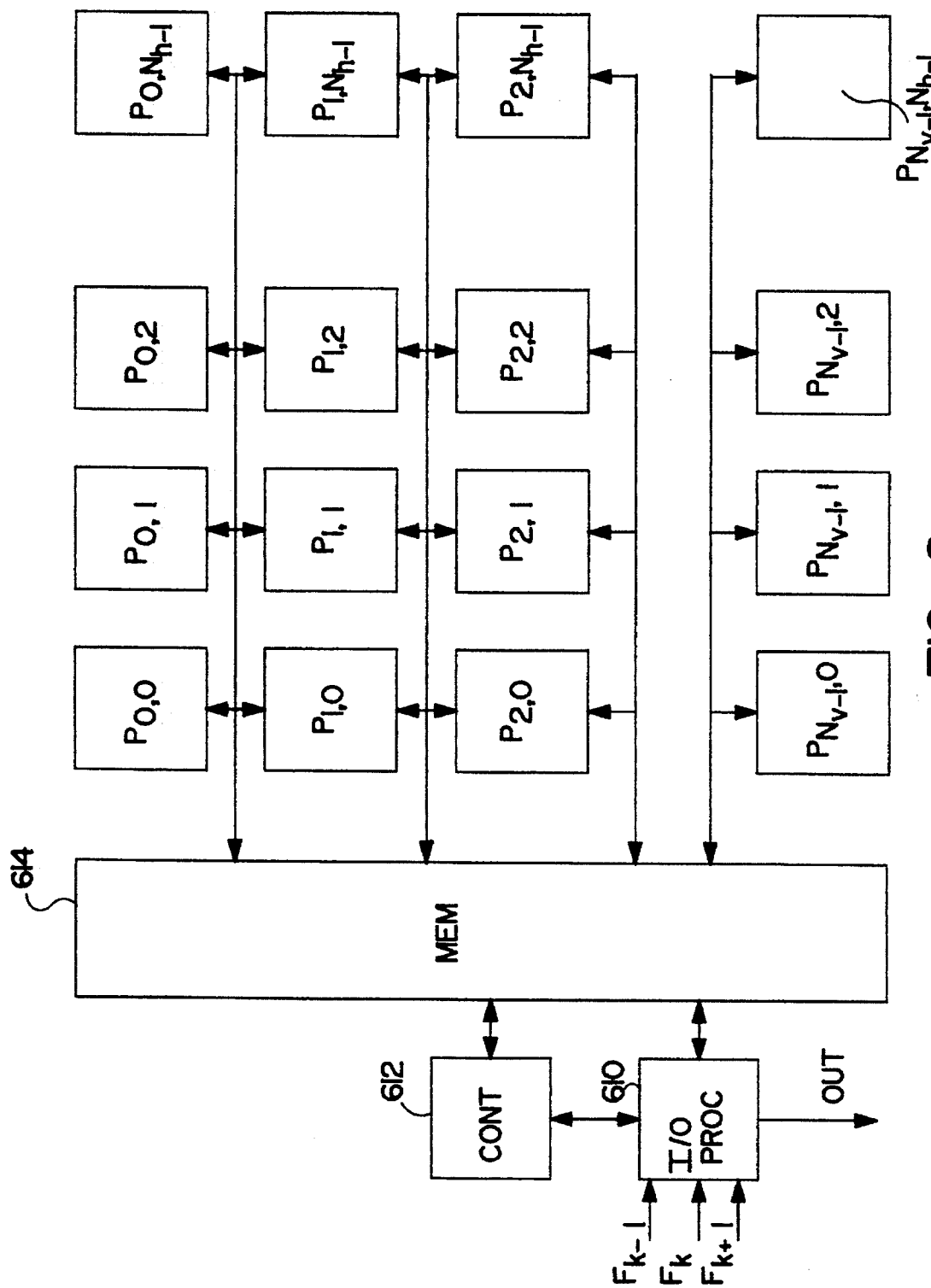
FIG. 6 is a block diagram of a parallel processor computer system suitable for implementing an embodiment of the present invention.

As shown in FIG. 6, input samples corresponding to a current field, $F_k$, a previous field $F_{k-1}$ and a next field $F_{k+1}$ are applied to an input/output (I/O) processor 610. This processor stores the samples into a multi-port memory 614 under control of a control processor 612. The memory 614 may be, for example, a distributed memory having a respectively different portion co-resident with each of the plurality of processors, $P_{0,0}$ through $P_{Nv-1,Nh-1}$. The controller 614 and the processors $P_{0,0}$ through $P_{Nv-1,Nh-1}$ operate according to the method described below with reference to FIG. 7 to produce the samples representing the motion vector field from samples representing two or three image fields.

Although the I/O processor 610 is shown as receiving three frames of data, it is contemplated that, in steady state operation, only one new frame of data will be applied to the processor 610 at any given time. Two of the previously stored frames will simply be redesignated such that the stored data corresponding to the frame $F_k$ will become data representing frame $F_{k+1}$ and the stored data corresponding to the frame $F_{k-1}$ will become data representing frame $F_k$.

It is also contemplated that the two-frame method of generating the motion vector field, described above, may also be implemented using the processor system shown in FIG. 6. In this instance, only two frames, $F_k$ and $F_{k+1}$ are stored in the memory 614 and used by the processors $P_{0,0}$ through $P_{Nv-1,Nh-1}$.

Figure 7:
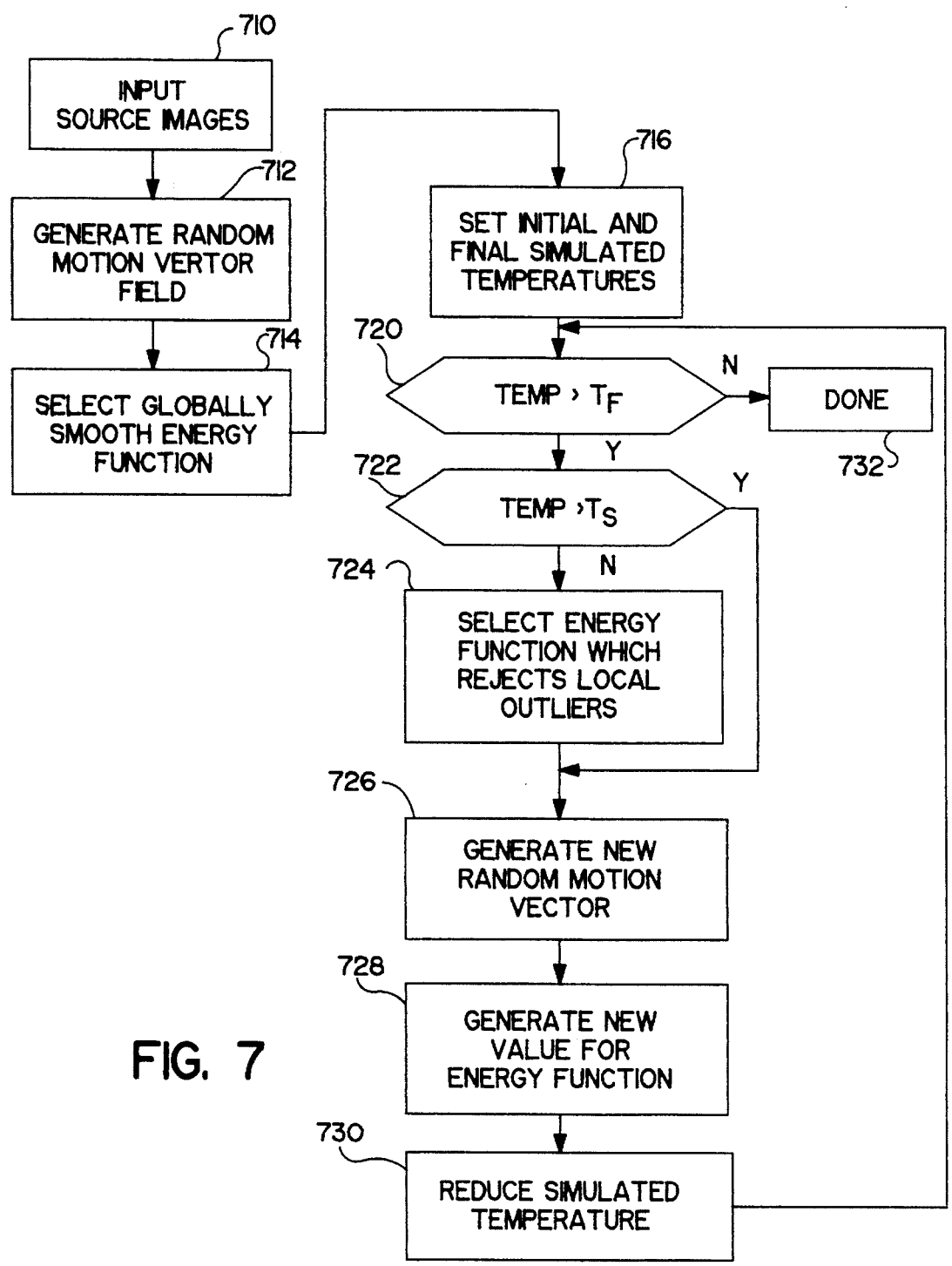
FIG. 7 is a flow-chart diagram which illustrates the generation of a motion vector field according to the present invention.

FIG. 7 is a flow-chart diagram which illustrates the overall operation of an exemplary embodiment of the invention. In the first step in this process, step 710, the source images are stored into the memory 614 by the I/O processor 610. As set forth above, the memory 614 may be a monolithic multi-port memory or it may be distributed among the processors $P_{0,0}$ through $P_{Nv-1,Nh-1}$. Accordingly, the act of storing the pixel values into the memory also assigns the values to the respective processors. In the exemplary embodiment of the invention, each processor only needs access to its target pixel value and neighboring pixel values from both the current frame and the other frame or frames being input to the system.

Next, at step 712, each of the individual processors generates a random motion vector for its pixel. This may be done, for example by using a pseudo-random number generator for which each processor uses a respectively different seed value.

At step 714, one of the globally smooth energy functions is defined for each pixel in the frame. These functions are defined by equations (5) and (12) above. At step 716, the initial and final simulated temperatures are set. As described above, exemplary values for these temperatures are 500 and 0.1, respectively. At step 720, if the current simulated temperature value is greater than the final simulated temperature value, control is passed to step 722. Otherwise, the process is complete at step 732.

Step 722 compares the current simulated temperature value to a switching temperature value, $T_s$. If the current temperature is less than $T_s$, then, at step 724 the energy function is switched from one which assumes a globally smooth image to one which rejects local outliers (i.e. from equation (5) to equation (6) or from equation (12) to equation (13)). The globally smooth energy function is used to reduce the computation overhead as described above, however, it produces errors at moving edges in the image. The energy function which rejects outliers is then used to correct motion vectors at motion contours in the image.

Whichever energy function is selected, each of the processors $P_{0,0}$ through $P_{Nv-1,Nh-1}$, at step 726 generates a new random motion vector in accordance with equation (22). Alternatively, a new random motion vector may be generated in accordance with an equation (not shown), similar to equation (22), but modified in the same manner as equation (6) is modified from equation (5), to omit outliers from the generation of the motion vector.

Next, at step 728, a new value for the energy function is generated based on the new motion vector. At step 730, the simulated temperature is reduced and control is transferred to step 720, described above.

When the operation is complete, each of the processors $P_{0,0}$ through $P_{Nv-1,Nh-1}$ contains a value representing the motion vector for its corresponding pixel. These motion vectors are read from the memory 614 as a motion vector field by the control processor 612 and are applied to circuitry which uses the motion vector field sample values.

It is contemplated that the energy function which rejects local outliers in calculating the energy function value may be used as the only energy function in the process shown in FIG. 7. This may be accomplished, for example, by setting $T_s$ equal to $T_o$.

It is further contemplated that the operation of deriving a motion vector field for a target image frame using image frames which precede and follow the target frame may be generalized to accommodate any number of additional frames. These frames may be combined in pairs, triples or other multi-frame groupings to generate the trial motion vectors. In these alternative embodiments, the criteria for selecting one motion vector from the plurality of motion vectors corresponding to respective combinations of image frames may be the minimum motion vector or some other function of the motion vectors.

Figure 8:
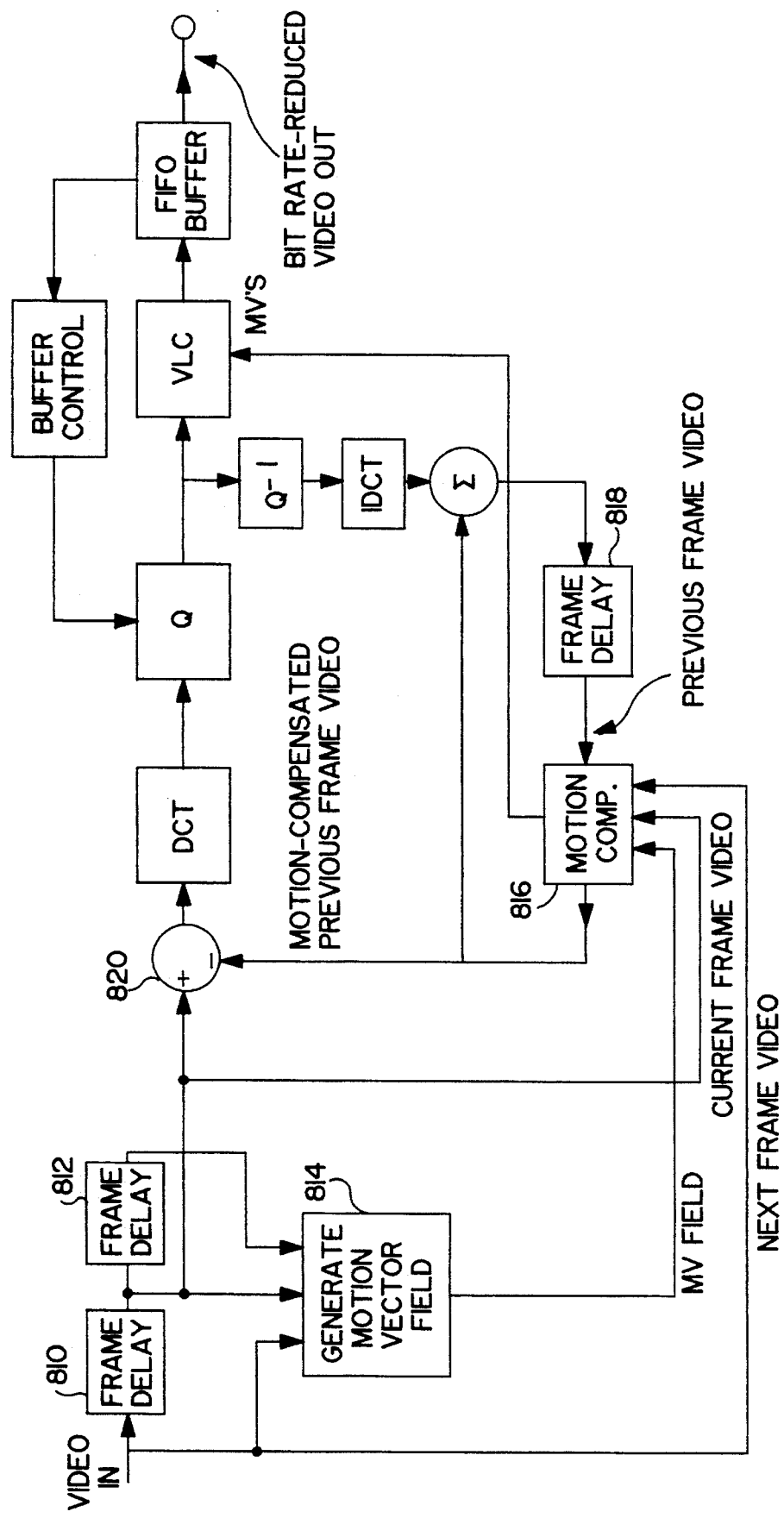
FIG. 8 is a block diagram of a video encoding system which uses an embodiment of the invention to aid in motion adaptive encoding of video signals.
Figure 9:
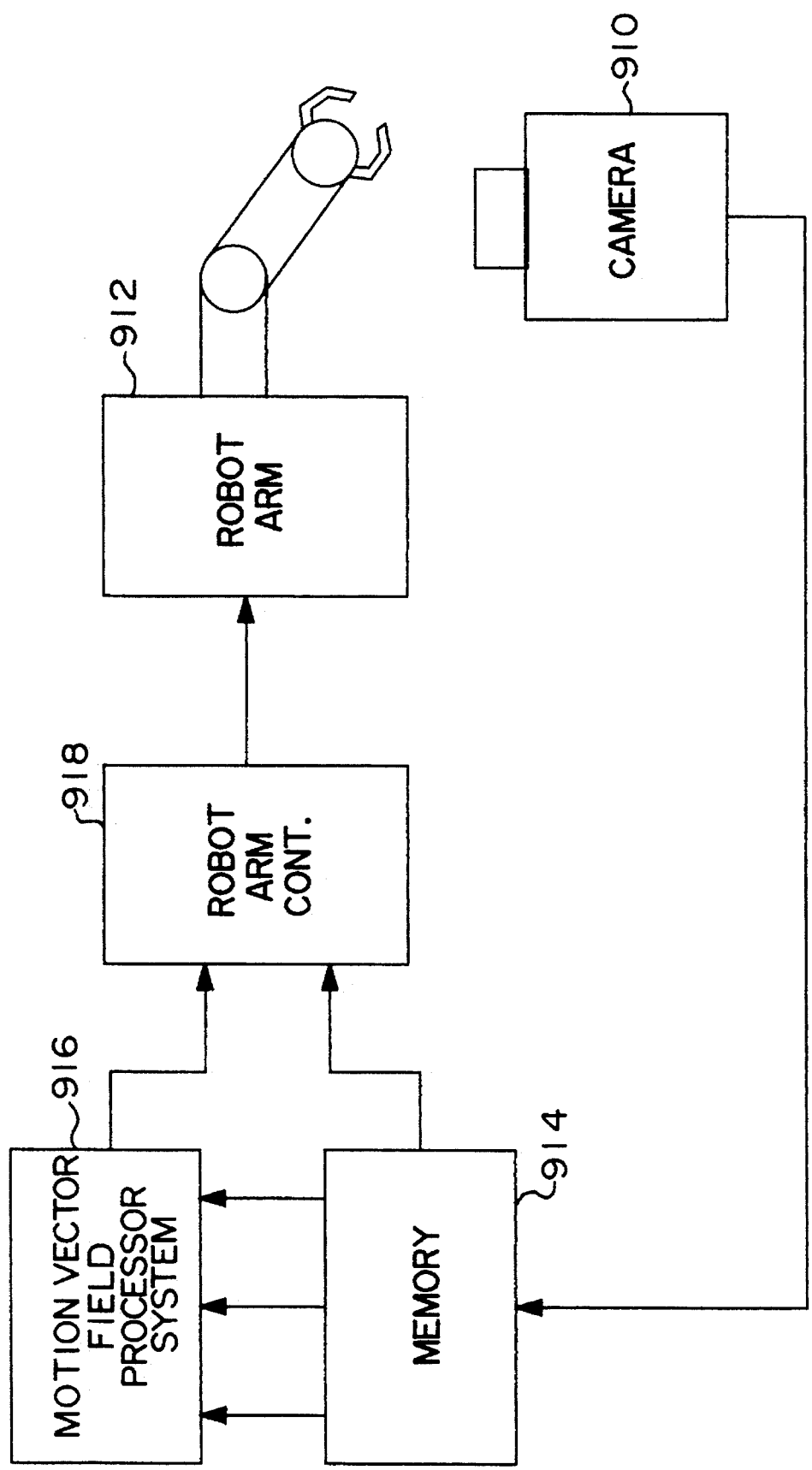
FIG. 9 is a block diagram of a robot vision system which uses an embodiment of the invention to aid in directing a robot arm, based on video input data.

Two exemplary systems which use motion vector field data are shown in FIGS. 8 and 9. FIG. 8 is a block diagram of a conventional motion adaptive video encoder circuit which has been adapted to include an embodiment of the present invention, and which may, for example, produce high-definition television signals encoded according to the standard defined by the Motion Picture Experts Group (MPEG). An exemplary system which operates according to this standard is described in U.S. Pat. No. 5,198,901 entitled DERIVATION AND USE OF MOTION VECTORS IN A DIFFERENTIAL PULSE CODE MODULATION SYSTEM, which is hereby incorporated by reference for its teachings on motion-adaptive video encoding techniques.

In the system shown in FIG. 8, an input video signal is applied to cascade-connected frame memories 810 and 812 and to a processor system, such as that shown in FIG. 6, which generates motion vector field data from the input image data. The input video signal, and the output signal of the frame memory 810 are applied to motion compensation circuitry 816 and the output video signal of the frame memory 810 is also applied to a subtracter 820.

In general terms, the encoder operates by encoding differential pixel values obtained by subtracting current video information (provided by memory 810) from decoded video information from a previous frame (provided by frame memory 818). These systems also include a method by which video data may be generated, based on similar data in either a preceding frame, a succeeding frame or both. To allow for motion in these processes, the data in the current frame is subtracted from the image data from one of the other frames which most closely matches the data in the current frame. For any given block of pixel values, this data is identified by a motion vector.

Using an exemplary embodiment of the invention, the processor 814 provides data values representing a motion vector field to the motion compensation circuitry 816. The circuitry 816, in turn, uses this information to calculate the best motion vector for a block which includes a target pixel value. This motion vector may be calculated, for example, by averaging the individual motion vectors which correspond to the block of pixels from the current frame which are being applied to the subtracter 820.

Another method which may be used to accomplish substantially the same result is to implement the method described by the flowchart diagram in FIG. 7 using equations (5), (6), (12), (13) and (22) in which the individual pixel values are replaced by blocks of pixels. In this alternative implementation, operations to generate a motion vector and to determine the difference between two motion vectors would process blocks of pixels.

Another system which can use data representing a motion vector field to an advantage is shown in FIG. 9. This Figure is a block diagram of a robot arm control system. It includes a robot arm 912 and a camera 910 which scans the work area of the arm 912. Image data from the camera is applied to a memory 914 and, from the memory 914 to a processor system 916, such as the processor system shown in FIG. 6, which generates the motion vector field data. The motion vector field data is applied to a robot arm controller 918 which uses this data, as well as data from the robot arm 912 to operate the arm 912 in its work area.

Motion vector fields may be used in a system of this type to determine the relative motion of portions of the image corresponding to the robot arm 912 and other portions of the image corresponding to workpieces which are to be manipulated by the arm 912.

Although the invention has been described in terms of exemplary embodiments, it is contemplated that it may be practised as outlined above within the spirit and scope of the claims.

The invention claimed is:

1. Apparatus for generating sample values representing a motion vector field which describes motion of individual image components of a current image frame and corresponding image components of at least one other image frame in a sequence of image frames, the apparatus comprising:

memory means for holding data values representing respective image components of the current image frame and the one other image frame;

initialization means, coupled to the memory means, for generating a plurality of motion vectors, each of said plurality of motion vectors corresponding to an estimate of motion between one of the image components in the current image frame and a corresponding image component in the one other image frame;

means for generating an energy function value for a target motion vector of the plurality of motion vectors which said target motion vector corresponds to a current image component in the current image frame, said energy function value being a function of the target motion vector and of neighboring motion vectors which said neighboring motion vectors are ones of the plurality of motion vectors which correspond to ones of the image components that surround the current image component in the current image frame;

means for selecting ones of said neighboring motion vectors of the target motion vector for further processing, each one of the neighboring motion vectors is selected if the one neighboring motion vector differs in value from the target motion vector by less than a predetermined threshold; and means for minimizing the energy function value of each motion vector of the plurality of motion vectors as a function of the selected motion vectors to produce a corresponding optimized motion vector value, wherein the optimized motion vectors corresponding to the plurality of motion vectors define the motion vector field.

2. Apparatus according to claim 1, wherein each image component is an individual picture element (pixel) of the image.

3. Apparatus according to claim 1, wherein each image component includes a plurality of individual picture elements (pixels).

4. Apparatus according to claim 1, wherein the means for generating an energy function value for the target motion vector includes means for rejecting an outlier motion vector as a function of only the neighboring motion vectors which are adjacent to the target motion vector in the motion vector field.

5. Apparatus according to claim 4, wherein the means for generating the energy function value includes:
   means for comparing each of $N_c$ neighboring motion vectors which surround the target motion vector, where $N_c$ is a positive integer, to identify a predetermined number of the $N_c$ neighboring motion vectors which have larger magnitudes than any other ones of the $N_c$ neighboring motion vectors; and
   means for rejecting the identified neighboring motion vectors as outlier motion vectors.

6. Apparatus according to claim 4, wherein the means for generating the energy function value includes:
   means for evaluating each of $N_c$ neighboring motion vectors which surround the target motion vector, where $N_c$ is a positive integer, to assign a magnitude value to each of the $N_c$ neighboring motion vectors;
   means for identifying one of the assigned magnitude values as being a median magnitude value for the $N_c$ neighboring motion vectors; and
   means for rejecting the identified neighboring motion vectors which have magnitude values greater than the median magnitude value as being outlier motion vectors.

7. Apparatus according to claim 4, wherein the means for minimizing the energy function value is an iterative process which includes means for switching the means for generating the energy function value, at a predetermined instant in the iterative process, from using a first energy function to generate the energy function value, which said first energy function uses all neighboring motion vectors, to use a second energy function to generate the energy function value, which said second energy function rejects outlier motion vectors.

8. Apparatus according to claim 1, wherein the motion vector field describes the motion of individual image components of the current image frame and corresponding image components in first and second image frame which differ from the current image frame, wherein:
   the initialization means includes means for generating a first plurality of motion vectors, each of said first plurality of motion vectors corresponding to an estimate of motion between one of the image components in the current image frame and a corresponding image component in the first image frame, and for generating a second plurality of motion vectors, each of said second plurality of motion vectors corresponding to an estimate of motion between one of the image components in the current image frame and a corresponding image component in the second image frame; and
   the means for generating an energy function value for the target motion vector includes:
   means for generating a first energy function value for the target motion vector, the first energy function value being a function of the target motion vector and respective neighboring ones of the first plurality of motion vectors;
   means for generating a second energy function value for the target motion vector, the second energy function value being a function of the target motion vector and respective neighboring ones of the second plurality of motion vectors; and
   means for choosing, as the generated energy function value, one of the first and second energy function values based on differences in magnitude between the first and second energy function values.

9. Apparatus according to claim 8, wherein the means for generating an energy function value for the target motion vector includes:
   means for generating a third energy function value for the target motion vector, the third energy function value being a function of the target motion vector, the neighboring ones of the first plurality of motion vectors and the neighboring ones of the second plurality of motion vectors; and
   means for choosing, as the generated energy function value, one of the first, second and third energy function values based on differences in magnitude among the first, second and third energy function values.

10. Apparatus according to claim 1, wherein the means for minimizing the energy function value in the current image frame includes means for processing a plurality of the energy function values using a simulated annealing algorithm.

11. A method of generating sample values representing a motion vector field which describes motion of individual image components of a current image frame and corresponding image components of at least one other image frame in a sequence of image frames, the method comprising the steps of:
   a) holding data values representing respective image components of the current image frame in a memory;
   b) generating a plurality of motion vectors, each of the plurality of motion vectors corresponding to a respectively different one of the image components in the current image frame;
   c) generating an energy function value for a target motion vector of the plurality of motion vectors which said target motion vector corresponds to a current image component in the current image frame, said energy function value being a function of the target motion vector and of neighboring motion vectors which said neighboring motion vectors are ones of the plurality of motion vectors which correspond to ones of the image components that surround the current image component in the current image frame;
   d) selecting ones of said neighboring motion vectors of the target motion vector for further processing, each one of the neighboring motion vectors is selected if the one neighboring motion vector differs in value from the target motion vector by less than a predetermined threshold; and
   e) minimizing the energy function value of vectors as a function of the selected motion vectors to produce a corresponding optimized motion vector value, wherein the optimized motion vectors corresponding to the plurality of motion vectors define the motion vector field.

12. A method according to claim 11, wherein each image component is an individual picture element (pixel) of the image.

13. A method according to claim 11, wherein each image component includes a plurality of individual picture elements (pixels).

14. A method according to claim 11, wherein step c) includes the step of rejecting an outlier motion vector based only on the neighboring motion vectors which are adjacent to the target motion vector in the motion vector field.

15. A method according to claim 14, wherein step f) is an iterative process which includes the step of switching, at a predetermined instant in the iterative process, from using a first energy function, which uses all neighboring motion vectors, to generate the energy function value to using a second energy function, which rejects outlier motion vectors, to generate the energy function value.

16. A method according to claim 11, wherein the motion vector field describes the motion of individual image components of the current image frame and corresponding image components in first and second image frames which differ from the current image frame, wherein:

step b) includes the steps of generating a first plurality of motion vectors, each of the first plurality of motion vectors corresponding to an estimate of motion between one of the pixels in the current image frame and a corresponding pixel in the first image frame, and generating a second plurality of motion vectors, each of the second plurality of motion vectors corresponding to an estimate of motion between one of the image components in the current image frame and a corresponding image component in the second image frame; and step c) includes the steps of:
generating a first energy function value for the target motion vector, the first energy function value being a function of the target motion vector and respective neighboring ones of the first plurality of motion vectors;

generating a second energy function value for the target motion vector, the second energy function value being a function of the target motion vector and respective neighboring ones of the second plurality of motion vectors; and choosing, as the generated energy function value, one of the first and second energy function values based on differences in magnitude between the first and second energy function values.

17. A method according to claim 16, wherein the step of generating an energy function value for the target motion vector includes the steps of:

generating a third energy function value for the target motion vector, the third energy function value being a function of the target motion vector, the neighboring ones of the first plurality of motion vectors and the neighboring ones of the second plurality of motion vectors; and choosing, as the generated energy function value, one of the first, second and third energy function values based on differences in magnitude among the first, second and third energy function values.

18. A method according to claim 11, wherein step e) includes the step of processing a plurality of the energy function values using a simulated annealing algorithm.

* * * * *